May 14, 1963  A. J. PARRAGA  3,089,404
AUTOMATIC COFFEE MACHINE
Filed Oct. 5, 1959  5 Sheets-Sheet 1

INVENTOR.
ALFREDO J. PARRAGA
BY
ATTORNEY

May 14, 1963 A. J. PARRAGA 3,089,404
AUTOMATIC COFFEE MACHINE
Filed Oct. 5, 1959 5 Sheets-Sheet 2

INVENTOR.
ALFREDO J. PARRAGA
BY
ATTORNEY

May 14, 1963 A. J. PARRAGA 3,089,404
AUTOMATIC COFFEE MACHINE
Filed Oct. 5, 1959 5 Sheets-Sheet 3
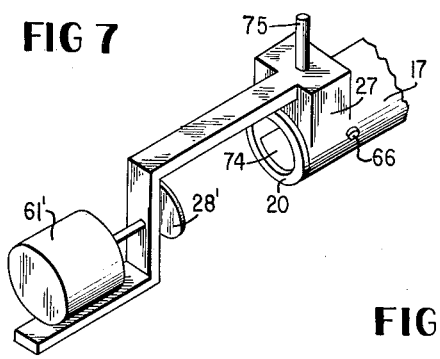
FIG 7
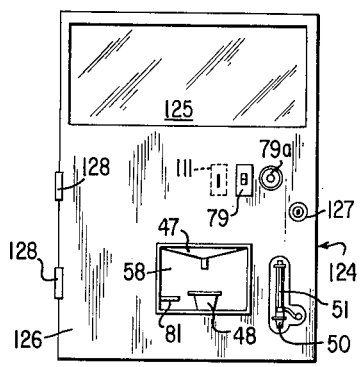
FIG 8
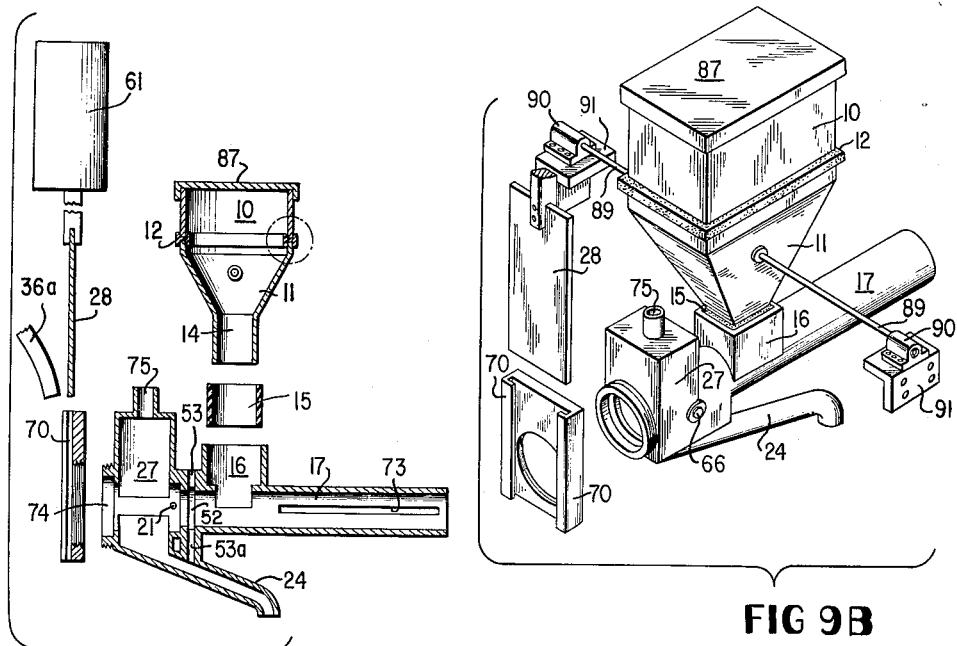
FIG 9
FIG 9B
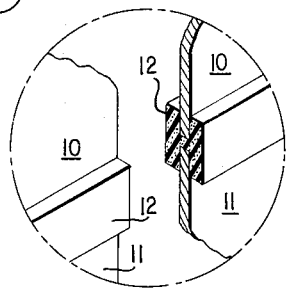
FIG 9A
INVENTOR.
ALFREDO J. PARRAGA
BY
ATTORNEY May 14, 1963 A. J. PARRAGA 3,089,404
AUTOMATIC COFFEE MACHINE
Filed Oct. 5, 1959 5 Sheets-Sheet 4

INVENTOR.
ALFREDO J. PARRAGA
BY
ATTORNEY

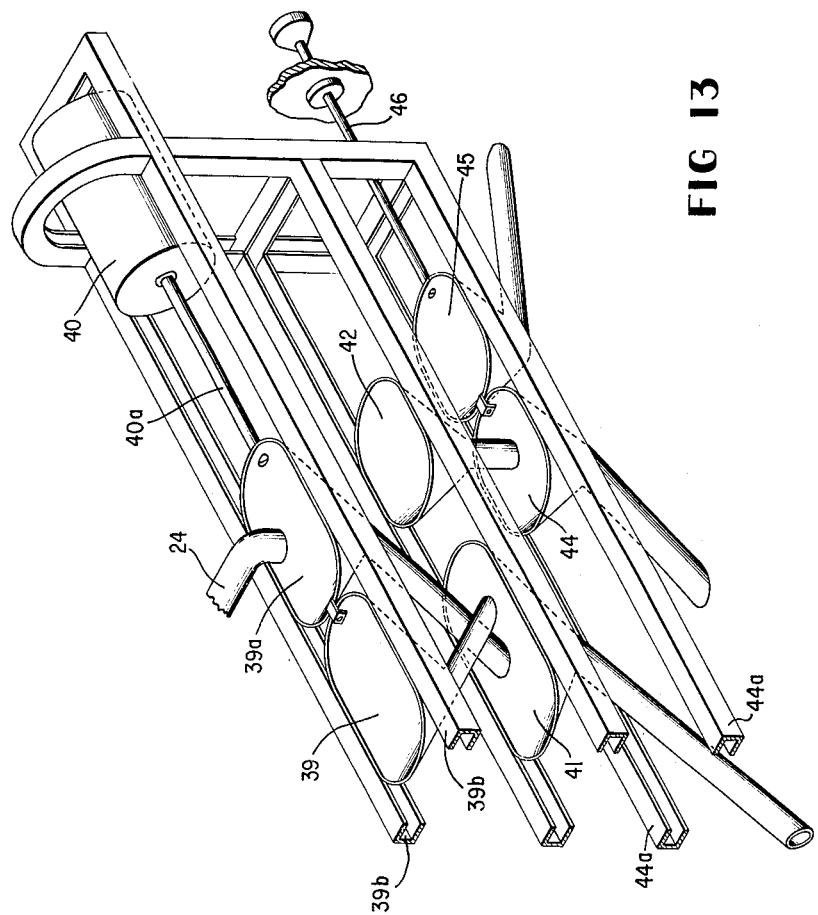

United States Patent Office 3,089,404
Patented May 14, 1963

3,089,404
AUTOMATIC COFFEE MACHINE
Alfredo J. Parraga, Vibora, Havana, Cuba
(3107 N. Haussen Court, Chicago, Ill.)
Filed Oct. 5, 1959, Ser. No. 844,434
18 Claims. (Cl. 99—289)

This invention relates to an automatic coffee making machine and more particularly to an electrically operated appliance of unique construction which will brew or compound a beverage a cup at a time for immediate consumption or retain such brewed beverage in a heated storage receptacle for dispensing at a later time.

It is an important object of the invention to provide an electrically operated beverage brewing device which utilizes a ground or powdered brew making material together with hot water and steam to compound the brew in a single cycle which makes one cup of the brew or in repeated cycles to fill or partially fill the storage tank.

Another object of the invention is to provide a device of the described character having an electrically operated and electro-mechanically controlled means for accomplishing a synchronized brewing cycle and for repeating such cycle as long as desired.

A further object of the invention is to provide an apparatus having means, automatically actuated as a part of the cycle of operation for cleansing the parts of the apparatus in which the beverage is produced whereby said apparatus will at all times be maintained in a clean and sanitary condition.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 7 is a fragmentary perspective view of a modified closure for the brewing chamber which is movable to uncover the chamber for ejecting of spent coffee grounds;

FIG. 8 is a reduced front elevation of the automatic coffee making machine;

FIG. 9 is an enlarged vertical section of the brewing chamber, hopper and associated parts of the machine;

FIG. 9A is an enlarged sectional view in perspective of that portion of the hopper shown circled at A in FIG 9;

FIG. 9B is a perspective view of the parts shown in FIG. 9 with certain parts exploded;

FIG. 13 is a fragmentary perspective view of the funnel arrangement for conducting the finished brew and rinse fluid.

Figure 1:
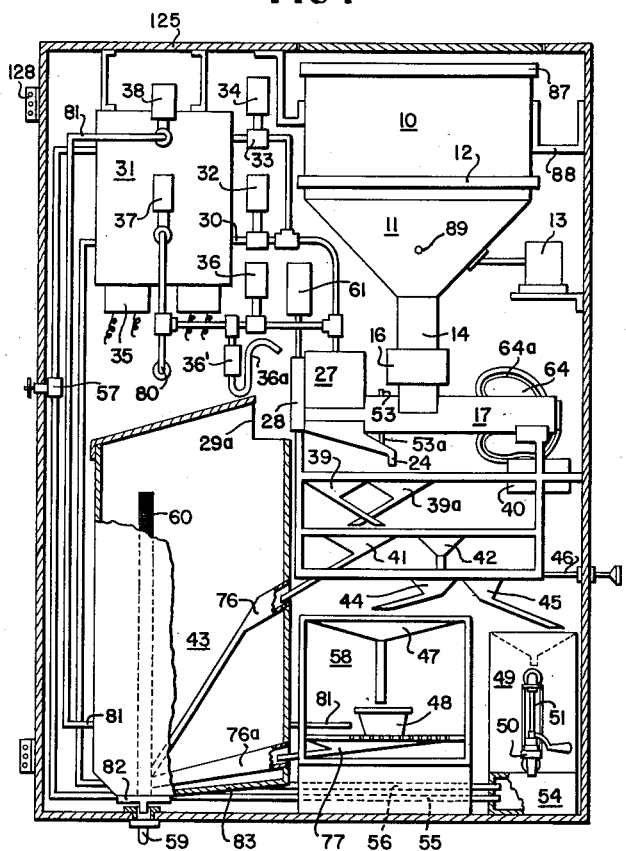
FIG. 1 is an elevation, partly in vertical section, looking into the front of the cabinet of the apparatus, with the front wall and parts carried thereby removed.

While the apparatus illustrated and described herein are preferred embodiments for the making and dispensing of coffee from ground coffee beans it will be readily understood that the invention is adaptable for the making of other beverages from ground or powdered brewing materials such as tea leaves or the like.

Referring now more specifically to the drawings, a preferred embodiment of automatic coffee machine is illustrated in FIG. 8 and designated in its entirety by the reference numeral 124. The machine comprises a cabinet 125 in which the apparatus is housed. The cabinet front wall 126 is preferably swingably supported on hinges 128 to permit opening thereof to afford access to the interior. The front wall is normally retained closed by a conventional key operated lock 127.

Figures 10A, 11, 11A:
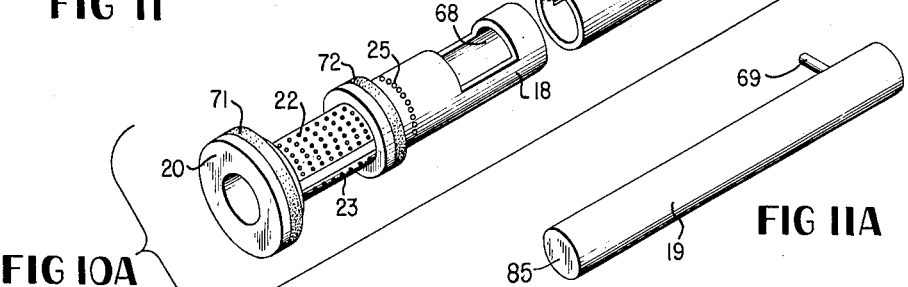
FIG. 10A is a perspective view of the parts illustrated in FIG. 10.
FIG. 11 is a longitudinal, axial section of the piston forming part of the assembly shown in FIG. 10.
FIG. 11A is a perspective view of the piston illustrated in FIG. 11.

Within the housing 125 are supported the parts and elements of the machine. These include a hopper 10, FIG. 1 for storing the ground coffee beans and also sugar if so desired. The hopper is closed by a cover 87 and supported from the cabinet by bracket 88. The hopper is provided with a lower or funnel like portion 11, having a discharge neck 14, which is vibratable by reason of the resilient fastenings or foam rubber gaskets 12 and 15, FIGS. 9 and 9B. The funnel 11 is held to the cabinet by means of a bar 89 that rests on two rubber cushion bushings 90 mounted in brackets 91. These supports together with gaskets 15 and 12 permit the funnel part 11 of the hopper to vibrate when so actuated by a motor 13, FIG. 1 and a suitable connecting rod fastened to the hopper and to an eccentric on the motor shaft in a conventional manner. The tubular body 17, FIGS. 1 and 9B, is provided to house an assembly which functions to measure and supply coffee to the brewing chamber, and to strain and discharge the waste coffee grounds as shown in FIGS. 3, 4, 5 and 6. Within tube 17 are fitted sleeves 18 and 26 and piston 19, FIGS. 10A and 11A. The interior cylindrical piece or piston valve skirt 18 is removably adjusted in the interior of the body 17 to serve as strainer and as a cylinder skirt for the piston 19 in its intermittent forward and backward movement. The outer end of skirt 18 has a projecting ring 20, of enlarged diameter. Near ring 20 are provided two, opposed perforated areas 22 and 23; area 22 is to let the water and the steam pass toward the coffee grounds once the coffee is in the interior of the skirt 18 between the two perforated areas, and the area 23 permits the brewed coffee to pass and drip toward the funnel 24. Skirt 18 has next to the two perforated areas, some small perforations 25 in the shape of a ring in its perimeter. These openings expel water or steam that may pass the piston during the brewing due to pressure of the water and the steam in the brewing chamber 27 and prevent such water from reaching the dry grind coffee in the measuring section of skirt 18 or in the hopper. An opening 68 is formed in skirt 18 to let the ground coffee in the hopper 11 fall therein through part 14 and collar 16 on tubular body 17.

Figure 3:
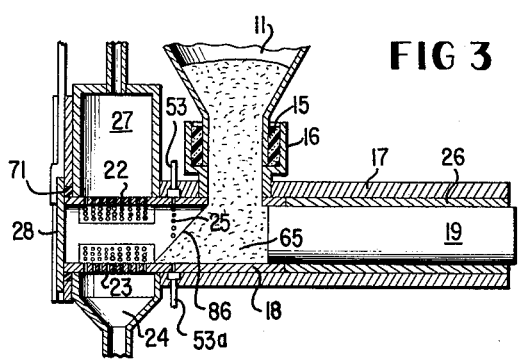
FIG. 3 is an enlarged vertical section of the brewing chamber and associated parts shown in the position of measuring coffee grounds at the start of an operational cycle.
Figure 3A:
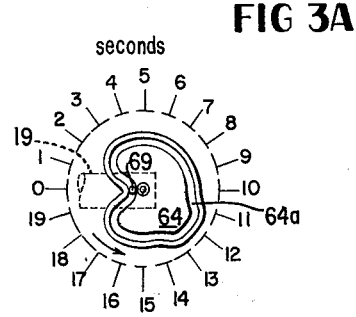
FIG. 3A is a sectional fragmentary diagram illustrating a control cam in the start position, corresponding to that of the parts shown in FIG. 3.

The coffee grounds measurer 65, FIG. 3 is formed by that section of the skirt 18 which receives the coffee, the measure being determined by the diameter, the size of the inlet 68, and the slope or talus 86 that is formed by the coffee when it falls into the valve skirt.

Figure 10:
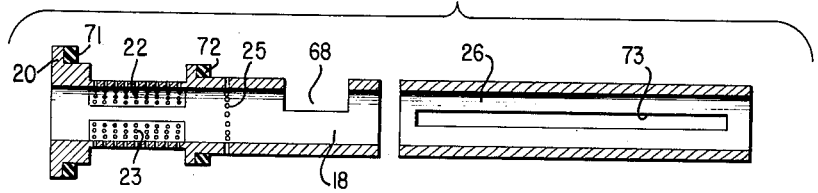
FIG. 10 is an enlarged vertical section of a slightly modified sleeve and associated parts similiar to the embodiment of FIGURE 7 and usable within the assembly shown in FIG. 9.

A washer 71, FIG. 10, is positioned between the projecting ring 20 and the body 17, and another washer 72, after the perforated areas 22 and 23. These prevent the water or steam from escaping to the outside from brewing chamber 27. Coinciding with the perforations 25 in the piston valve skirt 18, the outside body 17, FIG. 9, in its interior perimeter has a channel 52 which is connected to the lower drain orifice 53a, in funnel 24. In the upper part of channel 52 is another air inlet orifice 53, which prevents the water from being trapped in the drain orifice.

Aligned with the piston valve skirt 18, in the interior of the body 17, is another sleeve 26 of the same diameter and forming a continuation of same to serve as a piston sleeve to the piston valve 19, along the entire length of the body 17. A longitudinal slot 73 is formed in sleeve 26 to seat and guide the pin or spike 69 of the piston valve 19.

A brewing chamber 27 having an inlet 75 and an outlet funnel 24 are welded over openings in tube 17 adjacent to the perforated portions 22 and 23 of skirt 18. Thus the brewing chamber 27 is effectively extended to include the adjacent portion of skirt 18 which houses the measured coffee grounds and the means for admission of the water and steam from a boiler 31, as will be explained later. The skirt 18 is fixed to the tube 17 by means of a screw 66, FIG. 9B, threaded into drilled opening 21, FIG. 9.

The front of the body 17 and brewing chamber 27 is closed by a plate welded with two rails 70, in which a cover 28 slides. The cover is actuated by a solenoid 61 of double action or push pull type and is urged toward the outlet in the brewing chamber by means of wheels and springs (not shown) to keep it pressed against said outlet. Alternatively this sliding cover may be replaced by any other known system to cover and uncover this outlet at the indicated moment. A suitable modification is illustrated in FIG. 7, in which the solenoid 61' moves the cover 28' axially from the front to close the outlet 74 in tube 17. The solenoid 61 keeps the cover 28 lowered in FIG. 4, during the brewing and raises the cover in another action to allow the piston type valve 19 to expel the spent coffee grounds 29, see FIG. 5.

It is apparent from the above that tube 17 carries in its interior a strainer piston valve skirt 18 and a skirt 26 for the purpose of enabling removal and cleaning of the strainer and easy change of parts. It is also evident that the exterior body 17 with the internal skirts 18 and 26 can be formed of only one integral tube with no dismountable parts, if so desired.

The inlet 75 of the brewing chamber is fed by means of a number of tubes and connections, see FIG. 1. These include an outlet 30, to feed hot or boiling water for the brewing from boiler 31 controlled by a solenoid valve 32; an outlet 33, to feed steam for the brewing from the boiler, controlled by a solenoid valve 34; and a connection 80 to the running boiler inlet water, controlled by a solenoid valve 36.

Figure 2:
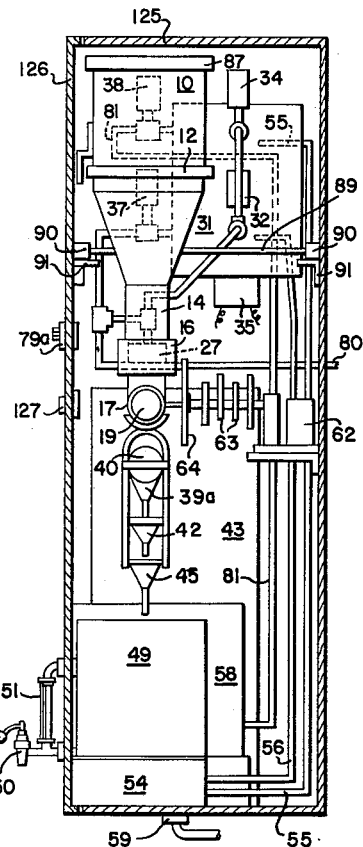
FIG. 2 is an elevation, looking into the side of the cabinet of the apparatus with the cabinet broken away.

The boiler 31 is a cylindrical boiler of conventional type. It is heated by two heaters or electrical resistances 35, FIGS. 1 and 12, automatically regulated by pressure control, and includes a safety valve and a water level control, all of conventional nature. A gas or any other fuel can also be used in this boiler. A solenoid valve 37 controls the water feed tube 80 and this may be operated manually if so desired by a normally open switch. The boiler 31 has an additional steam outlet tube 81 controlled by solenoid valve 38 to lead steam to the dispensing chamber 58 and there direct the steam against the coffee receiving cup 48 to prewarm the cup. As shown in FIGS. 1 and 2, the steam line may conveniently begin at the upper part of the boiler, extend forwardly, bend downwardly and to the rear, again bend downwardly and finally turn forwardly and into chamber 58, terminating with an open end near the cup.

The funnel 24, leading from the brewing chamber discharges alternatively on two sliding funnels 39 and 39a, which are mounted on a pair of rails 39b and actuated by the solenoid 40. Funnels 39 and 39a discharge on two fixed funnels 41 or 42. The outlet tube of funnel 41 discharges into the waste deposit receptacle 43, through a tube 76 which is connected to the drain 82. The funnel 42 discharges into one or the other of another pair of sliding funnels 44 and 45, which are also mounted on rails 44a and governed by a rod 46 projected to the outside of the cabinet to be operated manually. The rod 46 could be operated by a solenoid energized by a switch in the front of the cabinet if so desired. The funnel 44 discharges into funnel 47 which in turn discharges into the cup 48, placed in the dispensing chamber 58 for the consumer. The funnel 45 discharges into a storage tank 49 to store the brewed coffee.

The storage receptacle 49 has its bottom inclined or sloped toward a faucet 50 and is provided with a level guage 51. Both the faucet and guage are projected outward of the cabinet 125 so that a person may serve himself directly from the faucet and to indicate the quantity of brewed coffee stored in the tank 49 without need for opening the front wall 126.

Under the tank 49, there is a closed chamber 54 having its upper wall shaped to receive and closely fit the bottom of the tank. The chamber 54 is connected to two tubes 55 and 56 leading to the boiler 31. The water or steam circulation to the chamber 54 is controlled by a manual valve 57 to maintain the storage tank 49 at an appropriate temperature.

The waste receptacle 43 is removable from the cabinet 125 as will appear hereinafter. The receptacle bottom is inclined to a drain 82. A mesh tube 60 extends lengthwise of the receptacle to separate solid matter such as coffee grounds from the liquid that may be emptied from the drain through the coupling 59. A pair of tubes 76 and 76a, branch from tube 60 and incline upwardly from the drain 82 to the wall of the receptacle. These tubes collect the drainage from funnels 41 and 77. The conduits 76 and 76a are larger in diameter than the outlet tubes of the funnel 41 and 77 so that the latter can be introduced easily, when the receptacle 43 is inserted into the cabinet. The drain 82 is easily seated in or lifted from the coupling 59 fixed to the cabinet, see FIG. 1. The bottom of dispensing chamber 58 is of perforated plate which discharges into funnel 77 to gather any coffee drippings.

Figure 12:
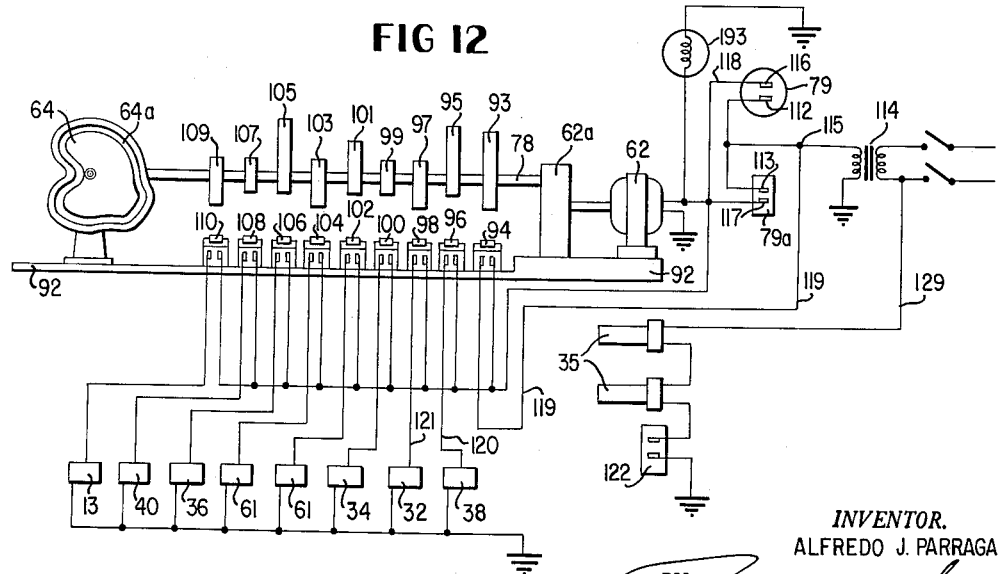
FIG. 12 is a view partly in vertical section and partly diagrammatic showing the electromechanical control elements and their circuit connections.

The electric circuit for synchronizing the various steps of a brewing cycle is shown in FIG. 12. A pair of switches 79 and 79a in parallel is provided, the first being preferably coin operated to brew a single cup and the second being a toggle type switch, manually operated for repeated cycles and storage of the brewed coffee. Either switch may of course be rendered inoperative or altered for manual or coin operation depending upon the intended usage of the apparatus. The switch contacts 112 and 113 are connected to one side of the power source 114, a transformer, by wiring 115. The other side of the power source is grounded. The other contacts 116 and 117 are connected by wiring 118 to the motor 62, to a pilot lamp 193, and to one contact of switch 94. The other sides of the motor and the lamp are grounded. The other contact of switch 94 is connected by wiring 119 to the current source 114. The contacts 117 and 116 of switches 79 are also connected by wiring 118 to one contact of each of the switches 96, 98, 100, 102, 104, 106, 108, and 110. The other contact of switch 96 is connected by wiring 120 to a solenoid valve 38 and thence to ground. The other contact of the switch 98 is connected by conductor 121 to solenoid valve 32, the other side of which is grounded. In a similar way the other contact of the switch 100 is connected by wiring to a solenoid valve 34, and the second contact of switch 102 is connected to solenoid 61 to energize a winding in one direction. The second contact of switch 104 is connected to solenoid 61 to energize a second winding in the opposite direction. The second contact of switch 106 is connected to solenoid valve 36; the other contact of switch 108 is connected to solenoid 40, and the second contact of switch 110 is connected to the motor 13.

The boiler 31 is provided with two heating elements 35 connected in series with each other and with a pressure control switch 122. Lead 129 connects the elements to the source 114, the circuits being completed through ground.

The motor 62 drives a shaft 78 through a reduction gear unit indicated by reference number 62a.

The shaft 78 carries a plurality of cams of different sizes and shapes which are disposed over the switches supported by panel 92. The cams are arranged to move into and out of engagement with the switches as the shaft 78 makes one complete revolution in twenty seconds or less when the motor 62 is energized. Thus the cams 93, 95, 97, 99, 101, 103, 105, 107, and 109 make and break the respective switches 94, 96, 98, 100, 102, 106, 108, and 110 at desired intervals in the twenty second brewing cycle. An additional cam 64, shown diagrammatically and for clarity in FIGURE 12 as turned at 90° out of its normal plane, is provided at the end of shaft 78. This cam has an irregularly shaped groove 64a in its outer surface which seats and guides the cam follower pin 69 on piston 19 of FIG. 11A. Various positions of cam 64 during a brewing cycle are illustrated in FIGS. 3A, 4A, 5A and 6A the corresponding positions of the piston 19 and its associated parts being shown in FIGS. 3, 4, 5 and 6 respectively.

Figure 4:
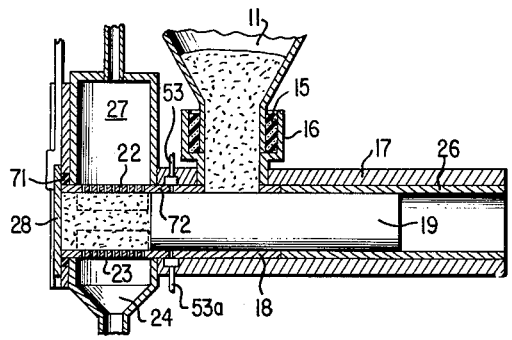
FIG. 4 is a view similar to that of FIG. 3, but showing the piston advanced to the steady brewing position.
Figure 4A:
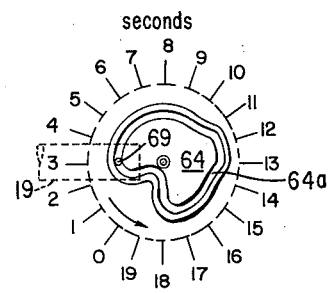
FIG. 4A is a view similar to that of FIG. 3A showing the first cam step corresponding to the position of parts in FIG. 4.

To operate the described apparatus a coin may be dropped into the coin slot 111 in the front wall of the cabinet. The coin is arranged by conventional apparatus, not shown, to close the switch 79 thus momentarily energizing both the motor 62 and pilot lamp 193 through conductors 115 and 118 to ground as shown in FIG. 12. When this occurs, the shaft 78 will be turned sufficiently to move cam 93 into closing engagement with switch 94 which establishes a holding circuit to retain power to the motor 62, as well as to the pilot lamp 193. The holding circuit comprises the power source 114, line 119, switch 94, line 118, the winding of motor 62 and ground. The initial movement of the shaft 78 causes the cam 64 to move from its first position FIG. 3A, to its FIG. 4A position thereby moving the piston 19 and pushing the coffee grounds from the measurer 65 as shown in FIG. 3 to the brewing chamber between the two perforated areas 22 and 23. While this occurs another cam 95 engages and closes switch 96, causing it to actuate the solenoid valve 38 which feeds steam to warm the cup 48 in the dispensing chamber 58. Immediately after this, while the shaft 78 continues to turn, the cam 64 also turning, holds the pin 69 and the piston 19 in a steady position for about eight seconds as indicated in FIG. 4A. During this period the shaft 78 will cause switch 98 to be closed by cam 97 to actuate the solenoid valve 32 for about two seconds and supply a measure of hot water to the brewing chamber 27. The switch 98 will then open as a result of disengagement of the cam 97. Cam 99 will then cause switch 100 to close and energize the solenoid of valve 34. This will supply the steam for about 6 seconds or less to chamber 27 to complete the brewing. The cam will then move out of engagement and close the valve. The cam 95 next moves out of engagement with the switch 96 closing the valve 38. Once the brewing is completed, cam 101 causes switch 102 to actuate solenoid 61 which raises the cover 28 to allow the waste ground coffee 29 to be expelled from the brewing chamber.

Figure 5:
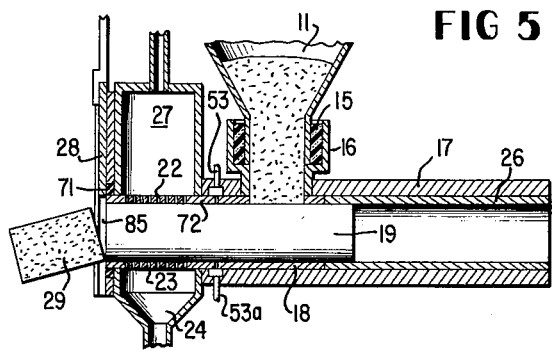
FIG. 5 is a view similar to that of FIG. 3, but showing the piston advanced to discharge the spent coffee grounds.
Figure 5A:
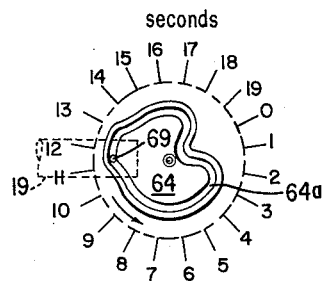
FIG. 5A is a view similar to that of FIG. 3A, showing the cam in its second step, corresponding to the positioning of the parts in FIG. 5.
Figure 6:
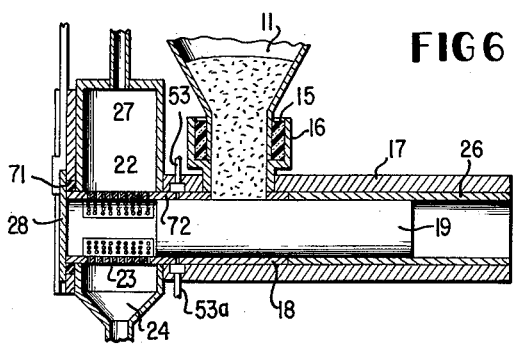
FIG. 6 is a view similar to that of FIG. 3 but showing the piston in retracted position for the cleansing operation.
Figure 6A:
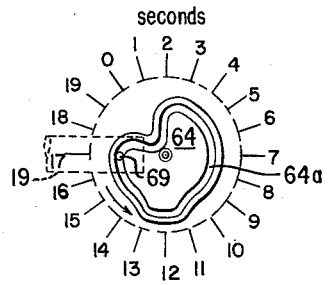
FIG. 6A is a view similar to that of FIG. 3A illustrating the cam in its third step corresponding to the positioning of parts in FIG. 6.

Further movement of cam 64 toward its position in FIG. 5A moves piston 19 to its position shown in FIG. 5 which expels the spent coffee 29 into the waste receptacle 43 through an opening 29a, FIG. 1 therein. The cam 64 holds the piston 19 steady in FIG. 5 position for a period of two seconds. At the moment the piston 19 reaches the end of the stroke in the leftward direction, cam 103 will close switch 104 to actuate the solenoid 61 in reverse direction. This lowers the closure 28 closing the outlet of the piston skirt 18. When cover 28 lowers, it touches and slides against the head 85 of piston 19, shaving from it any particles of ground coffee which may be adhered thus cleaning the piston head 85. When the cover 28 comes down there can be an extra feeding of water on top of it by means of a tube 36a, FIGS. 1 and 9 and a solenoid valve 36', FIG. 1 actuated by the aforementioned cam 103 and switch 104 which will help to clean the cover 28 and the head of the piston. A suitable catch basin, not shown, is utilized to convey the cover wash water to funnel or spout 24, or adjacent thereto. Following the ejection of the spent coffee, the cam 64 moving to its position shown in FIG. 6A moves the piston 19 back from the position in FIG. 5 to the position in FIG. 6 keeping the piston 19 steady in the latter position for a period of three seconds. At the start of this period cam 107 closes switch 108 energizing solenoid 40 which moves funnel 39 from under the funnel 24 for discharge during the brewing, substituting funnel 39a to collect the cleaning water to be passed through funnel 24, and to discharge it to funnel 41 which is connected to the waste receptacle 43. During the three second period cam 105 closes switch 106, to actuate solenoid valve 36 for about two seconds. The valve opens and feeds an amount of water from boiler inlet pipe 80 to brewing chamber 27 to wash the perforated areas 22 and 23 as well as other parts on which the coffee grounds may have adhered. The funnel 24 in the tube 17 discharges the cleansing water as well as the brewed coffee. Once the cleaning operation is performed cam 64 in its last step of the cycle returns the piston 19 from its position in FIG. 6 to its initial position shown at the start of the cycle in FIG. 3. During this movement cam 109 closes switch 110 to energize the vibrator motor 13 to shake the funnel 11 of the hopper so the coffee in its interior comes out loose and easily through the outlet 14 and fills the cylinder 18 forming a measure 65 for a new brewing. Coinciding with the arrival of piston 19 to the position in FIG. 3; cam 93 on shaft 78 completes its turn and disengages switch 94 to break the circuit to the motor 62, stopping the machine until a new cycle or brewing is initiated.

The brewing cycle of the machine as described above, initiated by a coin in slot 111 and operation of switch 79, brews a single cup of coffee which is discharged from the brewing chamber 27, through funnel 24, into sliding funnel 39, into fixed funnel 42 and from thence through funnels 44, and 47 into cup 48 in the dispensing chamber 58. If the operator desires to make continuous brewings, he closes the toggle switch 79a which remains closed until opened, and also pushes the rod 46, to move the sliding funnels 44 and 45. This moves funnel 44 out from under funnel 42 and sets the funnel 45 under the funnel 42 so the funnel 45 discharges into storage tank 49. The sliding funnels 39 and 39a are governed by solenoid 40 and when the brewing is performed, the solenoid 40 moves funnel 39 from under funnel 24 and sets funnel 39a under it as previously described to pass cleansing water to the waste receptacle. With the switch 79a remaining closed, the machine repeats the described brewing cycle until the desired level of coffee is deposited in tank 49 and the switch is manually opened.

Although certain specific embodiments of the invention have been shown and described, it is obvious that many modifications thereof are possible. The invention, therefore, is not to be restricted except insofar as is necessitated by the prior art and by the spirit of the appended claims.

What is claimed as new is:

1. In a beverage brewing machine having a boiler and a hopper for storing ground brew making material, the combination of a brewing chamber having an inlet opening for fluid from said boiler at one end and a discharge opening at the other, a sleeve crossing said chamber through opposed openings in the walls thereof, said sleeve having perforated areas to permit the entrance of fluid from the boiler and the exit of the brew, an opening in said sleeve adapted to receive ground brew making material from said hopper, and a piston movable in the sleeve to push the grounds received through said opening into the perforated portion of the sleeve within the brewing chamber, said sleeve being provided with an internal channel having air vent and drain openings, said channel being positioned outside said brewing chamber and between the chamber and said hopper communicating opening.

2. In a beverage brewing machine having a boiler and a hopper for storing ground brew making material, the combination of a brewing chamber having an inlet opening for fluid from said boiler at one end and a discharge opening at the other, a sleeve crossing said chamber through opposed openings in the walls thereof, said sleeve having perforated areas to permit the entrance of fluid from the boiler and the exit of the brew, an opening in said sleeve adapted to receive ground brew making material from said hopper, a piston movable in the sleeve to push the grounds received through said opening into the perforated portion of the sleeve within the brewing chamber, said opening in the sleeve being located at one side and beyond the brewing chamber, said sleeve terminating in an open end outside the opposite side of the brewing chamber, a movable closure for said open sleeve end, means for moving said closure to open the sleeve and permit said piston to eject spent grounds from the sleeve, and means for conducting a rinse fluid over said closure and open sleeve end at the time the closure is moved from the sleeve.

3. In a beverage brewing machine having a boiler and a hopper for storing ground brew making material, the combination of a brewing chamber having an inlet opening for fluid from said boiler at one end and a discharge opening at the other, a sleeve crossing said chamber through opposed openings in the walls thereof, said sleeve having perforated areas to permit the entrance of fluid from the boiler and the exit of the brew, an opening in said sleeve adapted to receive ground brew making material from said hopper, a piston movable in the sleeve to push the grounds received through said opening into the perforated portion of the sleeve within the brewing chamber, said opening in the sleeve being located at one side and beyond the brewing chamber, said sleeve terminating in an open end outside the opposite side of the brewing chamber, a movable closure for said open sleeve end, means for moving said closure to open the sleeve and permit said piston to eject spent grounds from the sleeve, and electric operating means for said piston including a motor having an output shaft, a cam on said shaft and a cam follower engaging said cam and connected to said piston, said cam being shaped to move said piston in one revolution of the cam from an initial position toward said sleeve to push a measured amount of grounds into the sleeve, hold the grounds in said sleeve while brewing takes place, move in the same direction to eject the spent grounds, and to retract the piston to said initial position to admit a measured amount of fresh grounds into said tube.

4. An automatic coffee making machine comprising a boiler, a hopper for storing fresh coffee grounds, a brewing chamber, a measuring chamber for grounds, a waste receptacle, a beverage dispensing chamber, a passage for conducting brewed coffee from the brewing chamber to the dispensing chamber, a movable section in said passage for conducting cleansing fluid from said brewing chamber to said waste receptacle, electrically operated means for admitting hot water and steam from the boiler, grounds from the hopper and cleansing fluid to said brewing chamber, electrically operated means for conducting steam from the boiler to the dispensing chamber against a receptacle positioned therein, and a motor driven cam shaft for operating said means to effect a brewing cycle, said cam shaft being operated to make and break circuits to establish the following sequence of operations; insert fresh grounds from the measuring into the brewing chamber, admit steam from the boiler to the brewing chamber, admit hot water from the boiler to the brewing chamber, admit steam to the brewing chamber, eject spent grounds from the brewing chamber to the waste receptacle, admit cleansing fluid to the brewing chamber and move said section of the passage to conduct the cleansing fluid from the brewing chamber to the waste receptacle.

5. The combination of a beverage brewing machine having a brewing chamber including a discharge opening, a dispensing chamber, a beverage storage chamber, and a waste receptacle with a beverage and rinse fluid conducting device, said device comprising a plurality of movable funnels disposed under said discharge opening, a pair of fixed funnels below said movable funnels, said plurality of movable funnels being selectively movable to conduct fluid from the brewing chamber to one or the other of said fixed funnels, one of said fixed funnels discharging to said waste receptacle, and a pair of funnels being selectively movable to conduct fluid discharged by the other of said fixed funnels to said dispensing chamber or to said beverage storage chamber.

6. The combination according to claim 5 wherein said plurality of funnels are slideably mounted in tracks.

7. The combination according to claim 5 wherein said plurality of funnels are moved by electrically operated means.

8. A beverage brewing machine comprising a cabinet, a boiler within the cabinet, a hopper for storing ground brew making material, a brewing chamber having brew dispensing orifices, means for supplying a measured amount of ground material from the hopper to said brewing chamber, means for supplying measured amounts of water and steam from said boiler to said brewing chamber, a waste receptacle, a beverage dispensing chamber open to the exterior of said cabinet, a storage receptacle, means for emptying used grounds from said brewing chamber to said waste receptacle, means for supplying a fluid to said brewing chamber after said grounds have been removed therefrom for cleaning the chamber, and means for conducting the prepared beverage from said brewing chamber to either said dispensing chamber or to said storage receptacle, said last named means including a solenoid operated funnel movable from an out of use position to a discharge position for receiving the cleansing fluid from the brewing chamber and discharging the cleansing fluid into said waste receptacle.

9. A beverage brewing machine comprising a cabinet, a boiler within the cabinet, a hopper for storing ground brew making material, a fixed brewing chamber having brew dispensing orifices, means for supplying a measured amount of ground material from the hopper to said brewing chamber, means for supplying separately measured amounts of brew making fluids from said boiler to said brewing chamber, a waste receptacle, a beverage dispensing chamber, a storage receptacle, means for emptying used grounds from said brewing chamber to said waste receptacle, means for supplying a fluid to said brewing chamber after said grounds have been removed therefrom for cleansing the chamber, and means for conducting the prepared beverage from said brewing chamber to either said dispensing chamber or to said storage receptacle, said last named means including a funnel slideable from an out of use position to a discharge position in which the funnel receives the cleansing fluid from the brewing chamber and discharges the cleansing fluid into said waste receptacle.

10. A beverage brewing machine comprising a boiler, a hopper for storing ground brew making material, a brewing chamber having brew dispensing orifices, means for supplying a measured amount of ground material from the hopper to said brewing chamber, means for supplying measured amounts of fluid from said boiler to said brewing chamber, means for supplying a cleansing fluid to the chamber, a waste receptacle, a beverage dispensing chamber, a beverage storage receptacle, and means for conducting the prepared beverage from said brewing chamber to either said dispensing chamber or to said storage receptacle, said last named means including a set of funnels operable to move between alternative locations in one of which the funnel set discharges into the dispensing chamber or storage receptacle and in the other of which the funnel set discharges into the waste receptacle.

11. A beverage brewing machine according to claim 10 wherein said hopper is provided with a vibrateable portion entirely separated from but secured to the other portions thereof by resilient fasteners, and further means is provided for vibrating said hopper portion to ensure feeding of said measured amount of ground material to the brewing chamber.

12. A beverage brewing machine comprising a cabinet, a boiler within the cabinet, a hopper for storing ground brew making material, a fixed brewing chamber having brew dispensing orifices, means for supplying a measured amount of ground material from the hopper to said brewing chamber, means for supplying measured amounts of water and steam from said boiler to said brewing chamber, means for supplying a cleansing fluid to the brewing chamber, a waste receptacle, a beverage dispensing chamber, a beverage storage receptacle, and means for conducting the prepared beverage from said brewing chamber to either said dispensing chamber or to said storage receptacle, said last named means including a set of funnels slideably mounted and electrically operated to move between alternative locations in one of which the funnel set discharges into the dispensing chamber or storage receptacle and in the other of which the funnel set discharges into the waste receptacle.

13. A beverage brewing machine comprising a cabinet, a boiler within the cabinet, a hopper for storing ground brew making material, a fixed brewing chamber having brew dispensing orifices, means for supplying a measured amount of ground material from the hopper to said brewing chamber, means for supplying measured amounts of water and steam from said boiler to said brewing chamber, means for supplying a cleansing fluid to the brewing chamber, a waste receptacle, a beverage dispensing chamber, a beverage storage receptacle, means for conducting the prepared beverage from said brewing chamber to either said dispensing chamber or to said storage receptacle, said last named means including a movable portion for conducting cleansing fluid to the waste receptacle, and a steam conduit and valve means therein leading from said boiler to the dispensing chamber whereby steam from the boiler may be directed against a cup seated in the dispensing chamber to warm the cup.

14. A beverage brewing machine according to claim 13 wherein said valve means is electrically operated, a solenoid being provided to open the valve at the beginning of the brewing cycle.

15. A beverage brewing machine comprising a cabinet, a boiler, a hopper for storing brew making material, a brewing chamber having brew dispensing orifices, means for supplying a measured amount of material from the hopper to said brewing chamber, means for supplying measured amounts of fluid from said boiler to said brewing chamber, a beverage dispensing chamber in said cabinet having an opening in its upper part, means for conducting the prepared beverage from said brewing chamber to said opening in the dispensing chamber for filling a cup seated in the chamber, a steam conduit and valve means therein leading from said boiler to the dispensing chamber, and means for actuating said valve means to direct steam from the boiler against the outside of a cup seated in the dispensing chamber to warm the cup before it receives the prepared beverage.

16. A beverage brewing machine comprising a cabinet, a boiler within the cabinet, a hopper for storing ground brew making material, a brewing chamber having an inlet opening for hot water and steam at one end and a discharge opening at the other, a sleeve crossing said chamber through opposed openings in the walls thereof, said sleeve having perforated areas to permit the entrance of water and steam and the exit of the brew, means for supplying a measured amount of ground material from the hopper to said brewing chamber including a tube in alignment with said sleeve, an opening in said tube for communication with said hopper, and a piston in said tube adapted to push the grounds from said tube into said sleeve, means for supplying measured amounts of water and steam from said boiler to said brewing chamber, a beverage dispensing chamber, a storage receptacle, and means for conducting the prepared beverage from said brewing chamber to either said dispensing chamber or to said storage receptacle, said piston being provided with electric operating means including a motor having an output shaft, a cam on said shaft and a cam follower engaging said cam and connected to said piston, said cam being shaped to move said piston in one revolution of the cam from an initial position toward said sleeve to push a measured amount of grounds into the sleeve, hold the grounds in said sleeve while brewing takes place, move in the same direction to eject the spent grounds, and to retract the piston to said initial position to admit a measured amount of fresh grounds into said tube, said shaft being provided with a plurality of additional cams, said means for supplying water and steam from the boiler including electrically operated valves and switches, said additional cams being operative to close and open said switches at appropriate times in the brewing cycle to coordinate admission of water and steam with the movements of said piston to place fresh grounds in the brewing chamber.

17. A beverage brewing machine comprising a boiler, a hopper for storing brew making material, a brewing chamber having an inlet opening for fluid from the boiler at one end and a discharge opening at the other, a sleeve crossing said chamber through opposed openings in the walls thereof, said sleeve having perforated areas to permit the entrance of fluid and the exit of the brew, means for supplying a measured amount of brewing material from the hopper to said brewing chamber including a tube in alignment with said sleeve, an opening in said tube for communication with said hopper, and a piston in said tube adapted to push the grounds from said tube into said sleeve, means for supplying measured amounts of fluid from said boiler to said brewing chamber, a beverage dispensing chamber, and means for conducting the prepared beverage from said brewing chamber to said dispensing chamber, said piston being provided with electric operating means including a motor having an output shaft, a cam on said shaft and a cam follower engaging said cam and connected to said piston, said cam being shaped to move said piston in one revolution of the cam from an initial position toward said sleeve to push a measured amount of brewing material into the sleeve, hold the material in said sleeve while brewing takes place, move in the same direction to eject the spent grounds, and to retract the piston to said initial position to admit a measured amount of fresh material into said tube, said shaft being provided with a plurality of additional cams, said means for supplying fluid from the boiler including electrically operated valves and switches, said additional cams being operative to close and open said switches at appropriate times in the brewing cycle to coordinate admission of fluid with the movements of said piston 18. An automatic coffee making machine comprising a cabinet, a boiler within the cabinet, a vibrateable hopper for storing fresh coffee grounds, a brewing chamber, a measuring chamber for grounds, a waste receptacle, a beverage dispensing chamber, a passage for conducting brewed coffee from the brewing chamber to the dispensing chamber, a movable section in said passage for conducting cleansing fluid from said brewing chamber to said waste receptacle, electrically operated means for admitting hot water and steam from the boiler, grounds from the hopper, and cleansing fluid to said brewing chambers, electrically operated means for conducting steam from the boiler to the dispensing chamber against a receptacle positioned therein, and a motor driven cam shaft for operating said means to effect a brewing cycle, said cam shaft being operative to make and break circuits to establish the following sequence of operations; insert fresh grounds from the measuring into the brewing chamber, admit steam from the boiler to the dispensing chamber, admit hot water from the boiler to the brewing chamber, admit steam to the brewing chamber, eject spent grounds from the brewing chamber to the waste receptacle, admit cleansing fluid to brewing chamber, move said section of the passage to conduct the cleansing fluid from the brewing chamber to the waste receptacle, and vibrate said hopper to admit fresh grounds to said measuring chamber.

References Cited in the file of this patent
UNITED STATES PATENTS

| | | |
|---|---|---|
| 1,805,159 | Bauer | May 12, 1931 |
| 1,903,111 | Harper | Mar. 28, 1933 |
| 2,315,777 | Denton | Apr. 6, 1943 |
| 2,387,871 | Baumann | Oct. 30, 1945 |
| 2,508,762 | Lapple | May 23, 1950 |
| 2,730,034 | Svendsgaard | Jan. 10, 1956 |
| 2,811,098 | Pavlecka | Oct. 29, 1957 |
| 2,868,109 | Davis | Jan. 13, 1959 |
| 2,887,036 | Voglesonger | May 19, 1959 |
| 2,907,266 | Moulden | Oct. 6, 1959 |
| 2,911,901 | Totten | Nov. 10, 1959 |
| 2,935,011 | Perlman | May 3, 1960 |